United States Patent [19]
Flickinger et al.

[11] Patent Number: 5,629,499
[45] Date of Patent: May 13, 1997

[54] ELECTRONIC BOARD TO STORE AND TRANSFER INFORMATION

[75] Inventors: Daniel Flickinger, San Francisco; Bo U. Curry, Redwood City, both of Calif.

[73] Assignee: Hewlett-Packard Company, Palo Alto, Calif.

[21] Appl. No.: 572,356

[22] Filed: Dec. 14, 1995

Related U.S. Application Data

[63] Continuation of Ser. No. 333,925, Nov. 3, 1994, abandoned, which is a continuation of Ser. No. 159,279, Nov. 30, 1993, abandoned.

[51] Int. Cl.⁶ .................................................. G08C 21/00
[52] U.S. Cl. ................................. 178/18; 364/709.11
[58] Field of Search ..................... 178/18, 19; 382/3; 345/179, 173, 74; 364/709.11

[56] References Cited

U.S. PATENT DOCUMENTS

| | | | |
|---|---|---|---|
| 4,047,010 | 9/1977 | Perotto et al. | 235/156 |
| 4,525,075 | 6/1985 | Kita | 368/10 |
| 4,656,317 | 4/1987 | Tsugei et al. | 178/18 |
| 4,818,826 | 4/1989 | Kimura | 178/19 |
| 4,953,225 | 8/1990 | Togawa et al. | 382/13 |
| 4,985,602 | 1/1991 | Kouhia | 178/18 |
| 5,045,645 | 9/1991 | Hoendervoogt et al. | 178/19 |
| 5,049,862 | 9/1991 | Dao et al. | 178/18 |
| 5,120,906 | 6/1992 | Protheroe et al. | 178/18 |
| 5,133,554 | 7/1992 | Piccinini, Sr. | 273/148 |
| 5,223,677 | 6/1993 | Kapp et al. | 178/18 |
| 5,243,149 | 9/1993 | Comerford et al. | 178/18 |
| 5,247,137 | 9/1993 | Epperson | 178/18 |
| 5,247,285 | 9/1993 | Yokota et al. | 345/169 |
| 5,411,790 | 5/1995 | Ogawa et al. | 178/18 |

FOREIGN PATENT DOCUMENTS

| | | |
|---|---|---|
| 3113105A | 10/1982 | Germany . |
| 2087611 | 5/1982 | United Kingdom . |
| WO92/09944 | 6/1992 | WIPO . |

OTHER PUBLICATIONS

Philip Bishop, "Wacom Tablets Keep Their Edge", MacWeek, Apr. 20, 1992,.

*Primary Examiner*—Stephen Chin
*Assistant Examiner*—Kevin Kim

[57] ABSTRACT

A low-cost and rugged electronic apparatus to store and to transfer written information. The apparatus includes a pen and a board, which has a sensing mechanism, a memory device and a communication link. When the pen imprints symbols to the board, the symbols are not concurrently electronically displayed. But the symbols are detected by the sensing mechanism, stored in the memory device, and can later be transferred to an electronic device through the communication link.

19 Claims, 7 Drawing Sheets

ELECTRONIC BOARD TO STORE AND TRANSFER INFORMATION

CROSS REFERENCE TO RELATED APPLICATION(s)

This is a continuation of application Ser. No. 08/333,925 filed on Nov. 3, 1994, now abandoned, which is a continuation of application Ser. No. 08/159,279 filed on Nov. 30, 1993, now abandoned.

BACKGROUND OF THE INVENTION

The present invention relates generally to electronic input/output devices and more particularly to an electronic board for storing and transferring information.

One constantly has to deal with different types of forms. For example, a government employee has to fill out administration forms, an applicant has to fill out application forms, and a warehouse owner has to fill out inventory forms. The information in the forms usually has to be filed or stored in a computer by an operator for later use. Many people have designed different devices to streamline such processes.

In one prior art design, a user writes directly on an electronic device with a screen. The written information is concurrently shown on the screen, and is also stored in the electronic device. This approach could be quite expensive due to the cost of the screen. Moreover, the device with a screen may be quite fragile, and may not be suitable to be used in a hostile environment.

In another prior art design, a user writes on an electronic pad with a computer connected to the pad. The computer shows and stores the written information. This approach could again be quite expensive.

It should be apparent from the foregoing that there is still a need for a low-cost electronic device that can solve the above-mentioned problems.

SUMMARY OF THE INVENTION

The present invention is a low-cost electronic board, which solves the problems of recording and transferring information even in a hostile environment. Prior methods either require a user to fill out a form and an operator to input the information into a storage device, or solve the problems in an expensive manner with pads and screens. The present invention provides a low-cost and durable solution to the problems.

All that is required is for the user to write the information on paper on top of an electronic board. The written information will be automatically stored in the board. The user, ignoring the electronics in the board, is just using the board as a support, as one normally does when one is filling out a form or taking notes.

The invention preferably includes a pen and a board that includes a sensing mechanism, a memory and a communication link. When symbols are coupled to the board through the pen, the symbols are not concurrently displayed electronically, but are detected by the sensing mechanism and stored in the memory. The symbols can also be transferred to another electronic device through the communication link for further manipulation, such as displaying the symbols.

Other aspects and advantages of the present invention will become apparent from the following detailed description, which, when taken in conjunction with the accompanying drawings, illustrates by way of example the principles of the invention.

Same numerals in FIGS. 1-7 are assigned to similar elements in all the figures. Embodiments of the invention are discussed below with reference to FIGS. 1-7. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
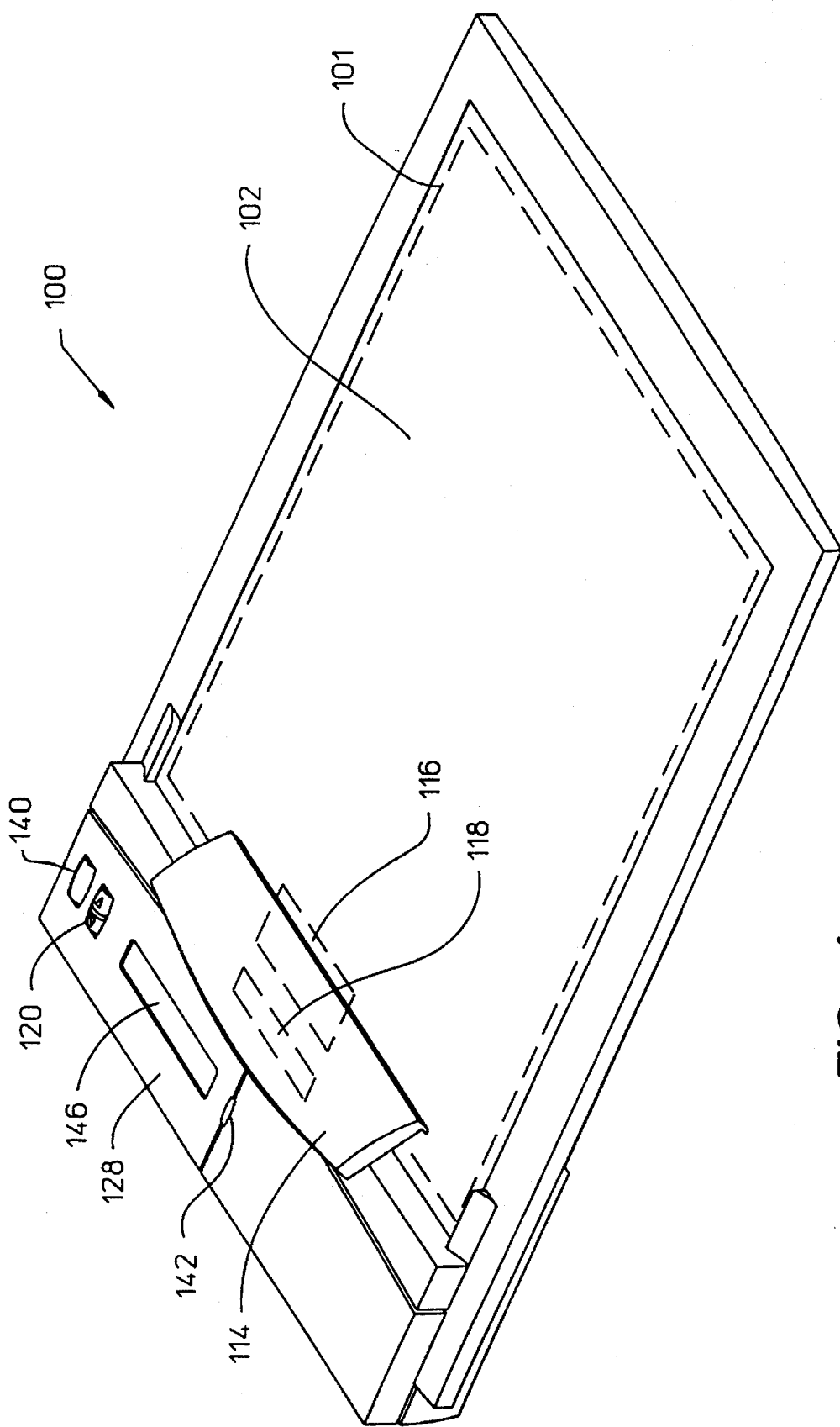
FIG. 1 shows the front view of the first preferred embodiment of the invention.
Figure 2:
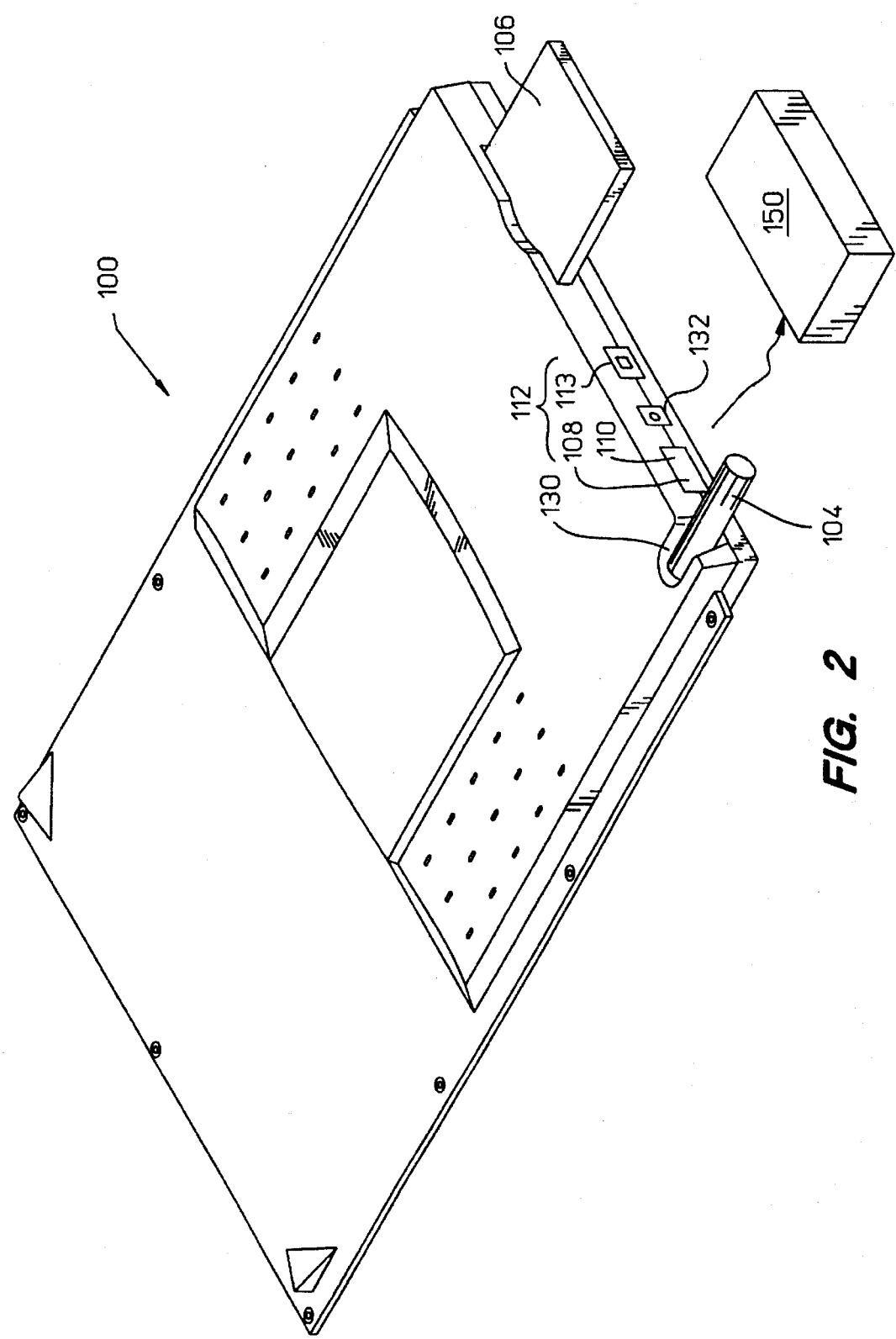
FIG. 2 shows the back view of the first preferred embodiment of the invention.
Figure 3:
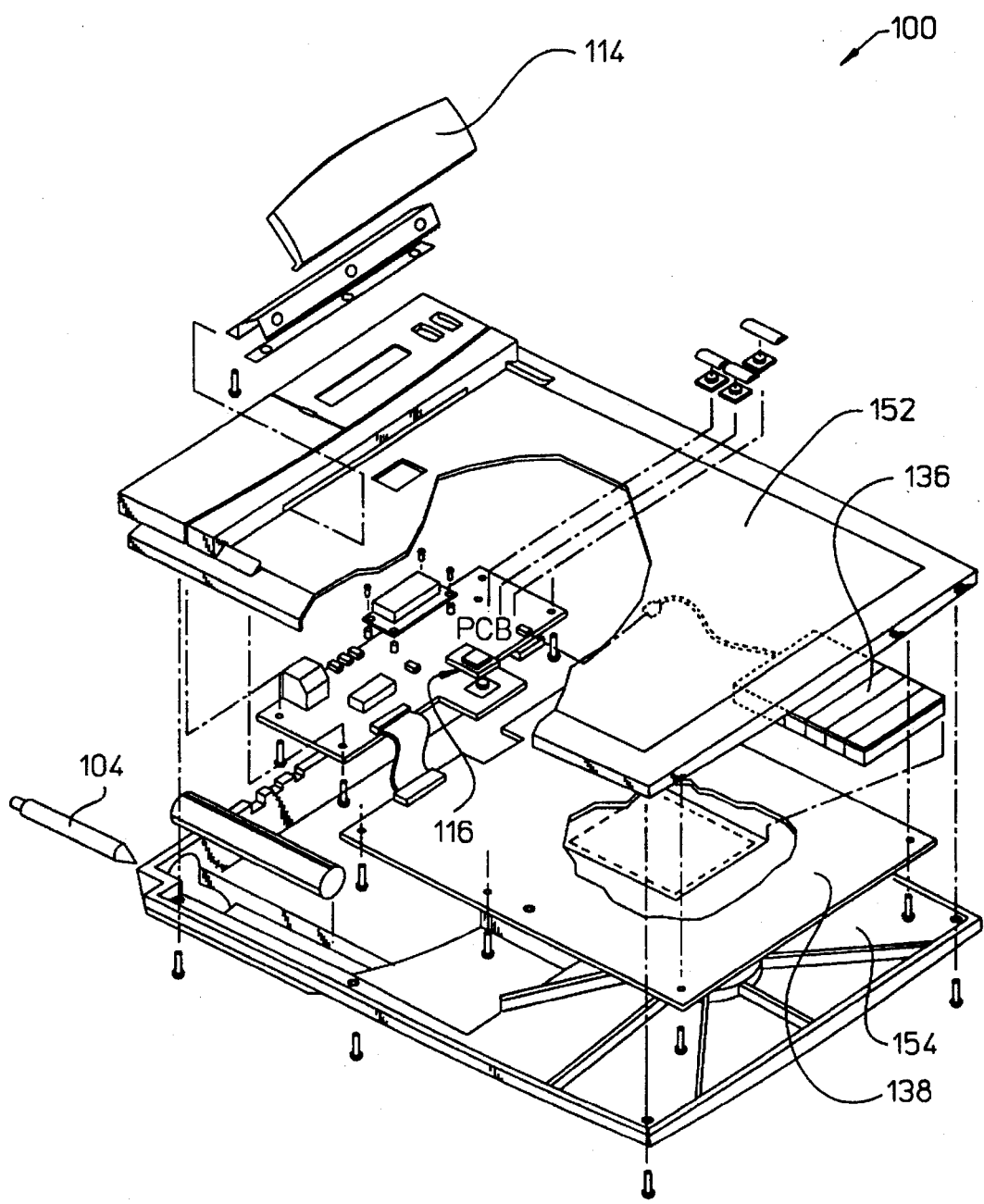
FIG. 3 shows some of the parts inside the first preferred embodiment.
Figure 4:
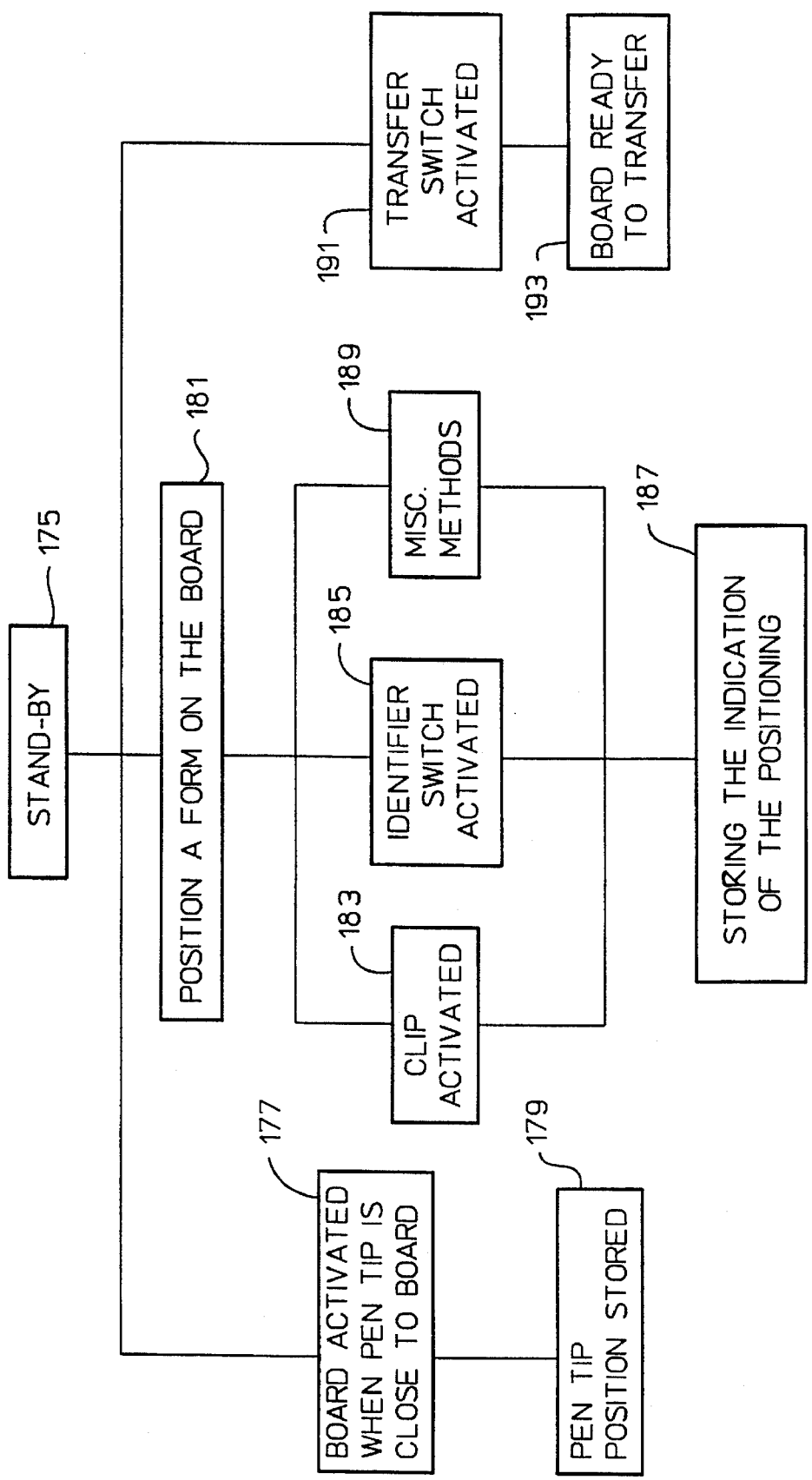
FIG. 4 shows a few process steps describing different operations in the first preferred embodiment.

FIG. 1 shows the front view of a first preferred embodiment 100 of the invention, and FIG. 2 shows its back view. The embodiment 100 includes a board 102 and a stylus, such as a pen 104. FIG. 3 shows some of the parts inside the first preferred embodiment 100, and Figure 4 shows a few process steps describing different operations in the first preferred embodiment 100.

The board 102 preferably works on rechargeable batteries 136 stored inside the board, which has an AC power jack 132 for charging the batteries. In another embodiment, dry batteries are also applicable or the board may be connected to an external power supply.

The board 102 preferably does not have an on/off switch. Normally, the board is in a standby or listening mode 175, so as not to deplete the batteries. During the standby mode 175, preferably, there is an electronic clock running inside the board 102 for indicating time and date.

Preferably, the board is automatically activated 177 when the tip of the pen 104 is in close proximity to the board 102. In the first embodiment, the board 102 includes a digitizing tablet 138, with a sensing mechanism 101 constantly generating an electromagnetic field. Once the tip of the pen 104 is in close proximity to the board 102, the electromagnetic field senses the tip, and the board is activated. Thus, the board has an automatic power activation mechanism; it activates the board 102 when the sensing mechanism 101 senses the tip of the pen 104. So, the embodiment does not need a separate power on/off switch. Such a mechanism is disclosed, for example, in "Wacom Tablets Keep Their Edge," written by Bishop, published in *MacWeek*, Apr. 20, 1992, and should be obvious to those skilled in the art.

The location of the tip of the pen is also registered by the sensing mechanism 102, and stored, 179, in a memory device 106 in the board. The memory device 106 may be a memory chip inside the first embodiment 100 or may be a removable card, such as a PCMCIA card, or both.

Another preferred mechanism to activate the board is to have an active pen constantly radiating an electromagnetic field, and sensors in the board constantly listening. When the tip of the active pen is in close proximity to the board, the board picks up the electromagnetic field from the pen, and is automatically activated, with the location of the tip of the pen registered and stored in the memory device 106.

A further preferred mechanism uses pressure sensors as the sensing mechanism. Many pressure sensors are positioned below the top surface of the board. When the user writes, the pen presses onto the board to activate the sensors and the board. The position of the tip of the pen is also registered and stored in the memory device 106.

When the first embodiment is in its standby mode, it is constantly listening for interrupts. One such interrupt occurs, as described above, when the tip of the pen 104 is in close proximity to the board 102. Another type of interrupt is indicated by positioning, 181, a piece of paper on the board, 102, for imprinting symbols.

Figure 5:
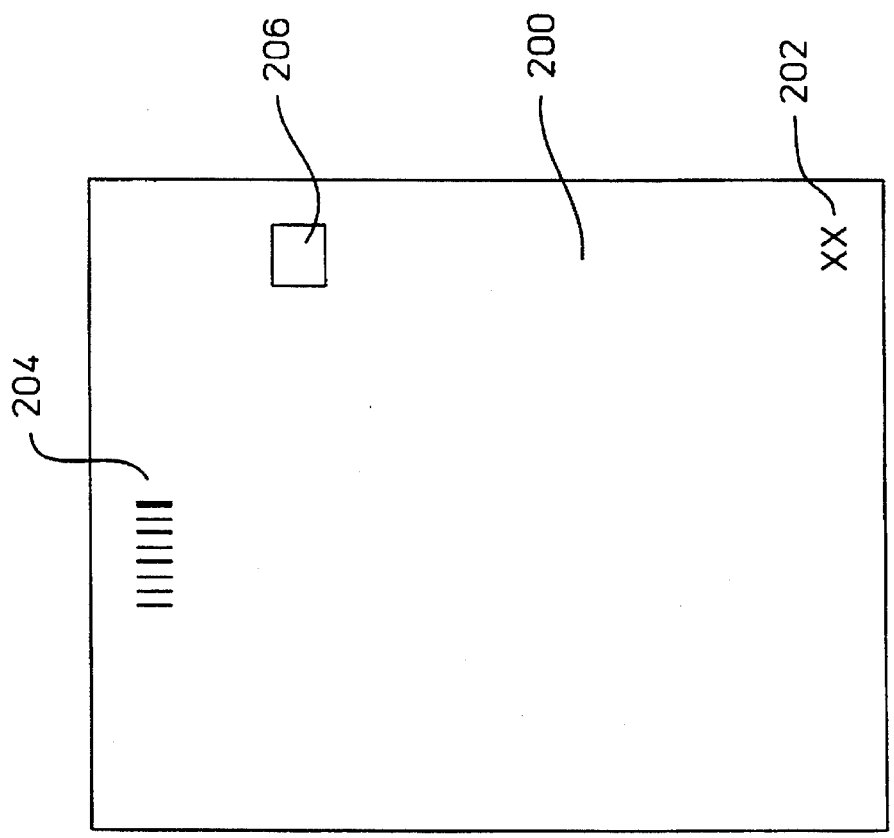
FIG. 5 shows a form to be used in the invention.

To record information with the first embodiment 100, the user probably picks up the board 102 and a piece of paper, such as the form 200 shown in FIG. 5. Then the user performs certain operation that may directly or indirectly create an indication that the form has been positioned on the board 102.

One such indication is through activating, 183, a holding mechanism 114 on the board 102 to hold onto the form 200. This holding mechanism 114 may be a clip pressing onto the board. There is preferably a sensing device 116 under the clip 114, which senses the pressure of the clip 114. This sensing device 116 may be a pressure sensor. Once the pressure from the clip 114 is below a certain level, an interrupt is generated and a tick-mark is stored in the memory 106 to indicate that there may be a new form positioned on the first embodiment. The time and date on the clock are preferably also stored in the memory 106 with the tick-mark. If the user just plays with the clip 114 by pressing it many times, preferably, every time the clip is pressed, its tick-mark overrides its prior tick-mark. Once the tip of the pen 104 is in close proximity to the board, 102, the tick-mark stored will not be overridden, but will be permanently stored in the memory 106. The first embodiment preferably includes the clip, but other holding mechanisms without any movable parts may be used, such as small lips positioned on the edges of the board.

Another indication method is through an identifier mechanism on the board 102. The form 200, preferably, has an identifier, such as a form number 202; for example, a number 5 designates an inventory form for GM cars and a number 6 designates a bankcheck. The user may store this form number in the memory 106 through one type of identifier mechanism, which is a switch 120. Every time the switch is pressed or activated, 185, an indication is generated to show that a new form may have been positioned on the board. Moreover, pressing the switch also generates different identifiers on a display, such as a liquid crystal display (LCD) 128. These identifiers were prestored in the memory 106 for identifying different types of forms. When the right identifier is shown, such as GM cars, the user stops pressing the switch. The right identifier or its representation is stored, 187, in the memory 106 when the tip of the pen 104 is in close proximity to the board 102.

Another type of switch is a toggle switch; every time the switch is toggled, again a different identifier is shown on the LCD. If the switch is not toggled, the first embodiment presumes that the identifier of the new form is the same as its prior form.

In another preferred embodiment, the form 200 has a bar-code 204, which is read by a bar-code reader 118 in the embodiment. The bar-code reader 118 may be under the clip 114. The reader automatically reads the bar-code 204 once the interrupt from the clip 114 is received.

After securing the form 200 to the board 102, the user picks up the pen 104, which may be stored inside a slot 130, and starts imprinting symbols, taking notes or writing onto the form with the pen 104. While the user is imprinting symbols or taking notes, all the symbols or the pen strokes are stored in the memory device. Note that the pen does not have to touch the board; as long as the tip of the pen is in close proximity to the board, the location of the tip will be registered by the board and stored in the memory device 106.

The storing function is transparent to the user. The user just fills out the form or takes notes on a piece of paper with the board as a support, as one normally does in writing. The user does not have to activate the board. She simply picks up the board and starts writing, and the information will be automatically stored in the board.

There may be many forms under the clip 114 on the board 102. The user may be flipping back and forth writing onto different forms without activating the clip 114. Different methods may be used to indicate, 189, that a new form is being used. In one example, a sound receiver is incorporated in the board, and the clip 114 holds onto a checkbook. When the user finishes filling out a check, the user may tear it out of the checkbook. The perforation sound activates an interrupt indicating that the user may be writing on a new check next time she uses the invention. This indication is stored in the memory 106. Other types of sound may be used for indication. Another indication method is to have a small printed box, 206, on the form; a different form has a box at a different position. Before writing onto the form, the user puts a check-mark in the box, which is used to identify the form, and the identification is stored in the memory.

When the user is ready to transfer all the stored information into another electronic device 150, such as a computer or a printer, the user may remove the PCMCIA card, and put it into the other electronic device. Another mechanism to pass the information is through a communication link 112. When the user presses a transfer switch 140, an interrupt is activated, 191, to command the transfer of data. At this point, the stored information is ready to be automatically transferred, 193, through the link 112 to the electronic device. The information would not be transferred until a hand-shaking signal is sent from the electronic device 150 and received by the preferred embodiment, indicating that the electronic device 150 is ready to receive the information.

One form of communication link 112 is a remote link, such as an infra-red link, a microwave link or a radio link, with a transmitter 108 and a receiver 110. The receiver 110 may also be used to modify the software stored inside the board 102. If the infra-red link is used, the electronic device receiving the infra-red signal should be in close proximity to the preferred embodiment 100. Another form of communication link 112 is through an RS-232 serial port 113 or an ethernet port or other means to communicate with the electronic device.

The other electronic device 150, such as a computer, receives, for example, the form number and the written information. The computer can retrieve the same type of form from its own memory. The written information can then be re-displayed on the computer at approximately the corresponding positions of the form where the information was filled in.

In the first preferred embodiment, the board preferably includes a functionality indicator 142 and an activity indicator 146. The functionality indicator 142 should be conspicuous and may be a red light-emitting diode or an electronic beep. In another embodiment, the functionality indicator 142 may be a specific digit on the LCD 128. The functionality indicator will automatically generate an interrupt signal if there is a functionality problem when the embodiment is activated. Functionality problems include the batteries being low in power, the embodiment being low in unused memory, the embodiment malfunctioning or the electronic device 150 receiving the transferred information not ready to communicate. When a functionality problem occurs, the problem is preferably described on the LCD 128.

The activity indicator 146 is preferably at a position on the LCD 128. It may be a letter displayed on the LCD. The letter shows up on the display when the board 102 is collecting and storing written information. If the pen 104 is not in close proximity to the board 102 or if the pen 104 is malfunctioning so that the written information is not captured, the letter will not show up on the display.

The first embodiment 100 includes a top 152 and a bottom 154 cover. The embodiment 100 is quite rugged and can be used in very hostile environments. With either no movable part or rugged movable parts, such as the clip, and no fragile components, such as glass on a screen, the embodiment can be tossed and thrown around, or kneeled on, without affecting the functionality of the embodiment.

In another embodiment, the invention is similar to the first embodiment, except it does not have a driver for a PCMCIA card, and it may not have an RS-232 serial port. In this embodiment, the invention is waterproofed, and can be used underwater. In this embodiment, one does not use paper, but may use a mechanism similar to a "Magic Slate," and write on a piece of plastic. The "Magic Slate" may be similar to the one disclosed in U.S. Pat. No. 5,133,554, titled, "Lotto Ticket Card Holder."

Figure 6:
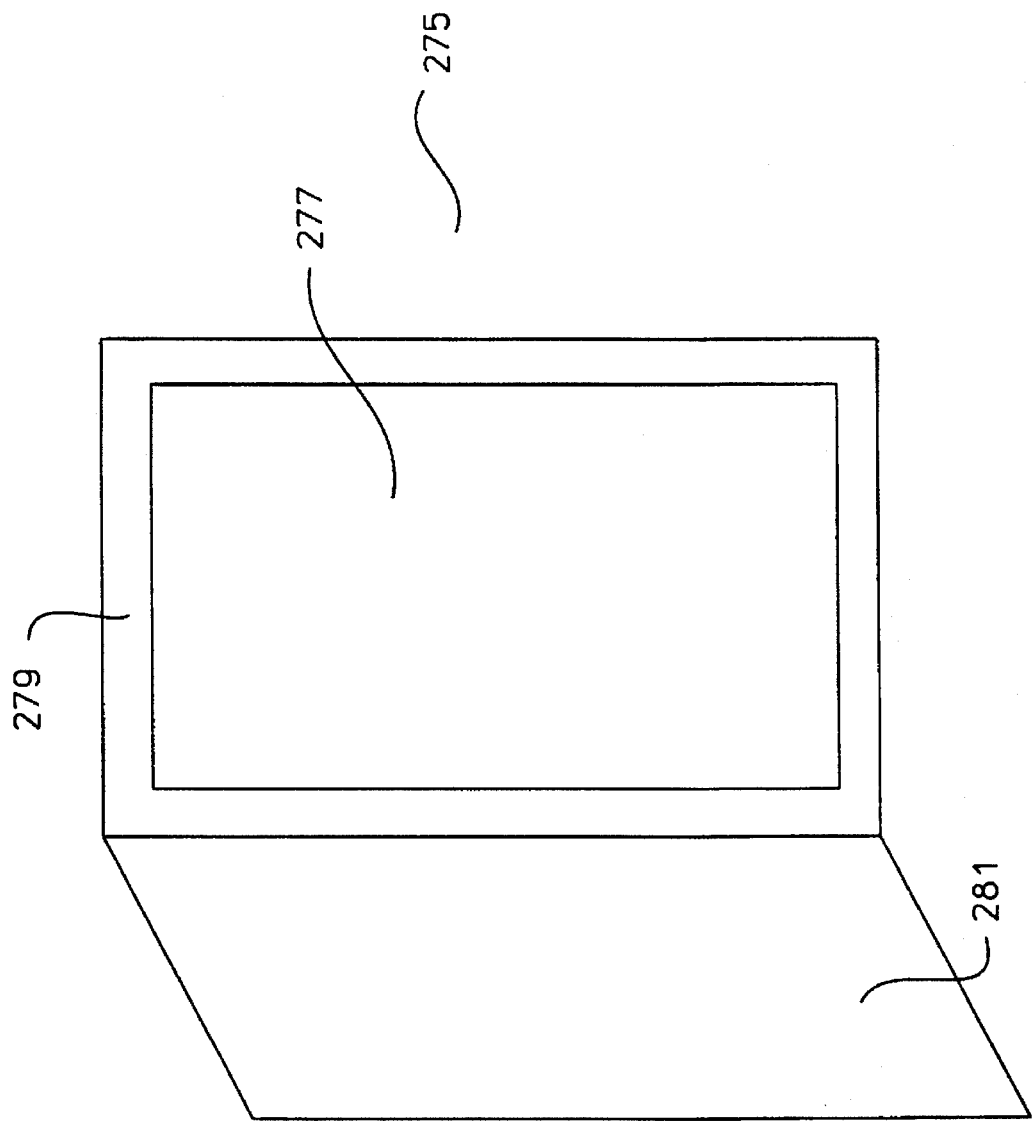
FIG. 6 shows a second preferred embodiment of the invention.

FIG. 6 shows a second preferred embodiment 275 of the present invention. It is similar to the first embodiment except that a board 277 similar to that of the first embodiment is in a folder 279 with a cover 281.

Figure 7:
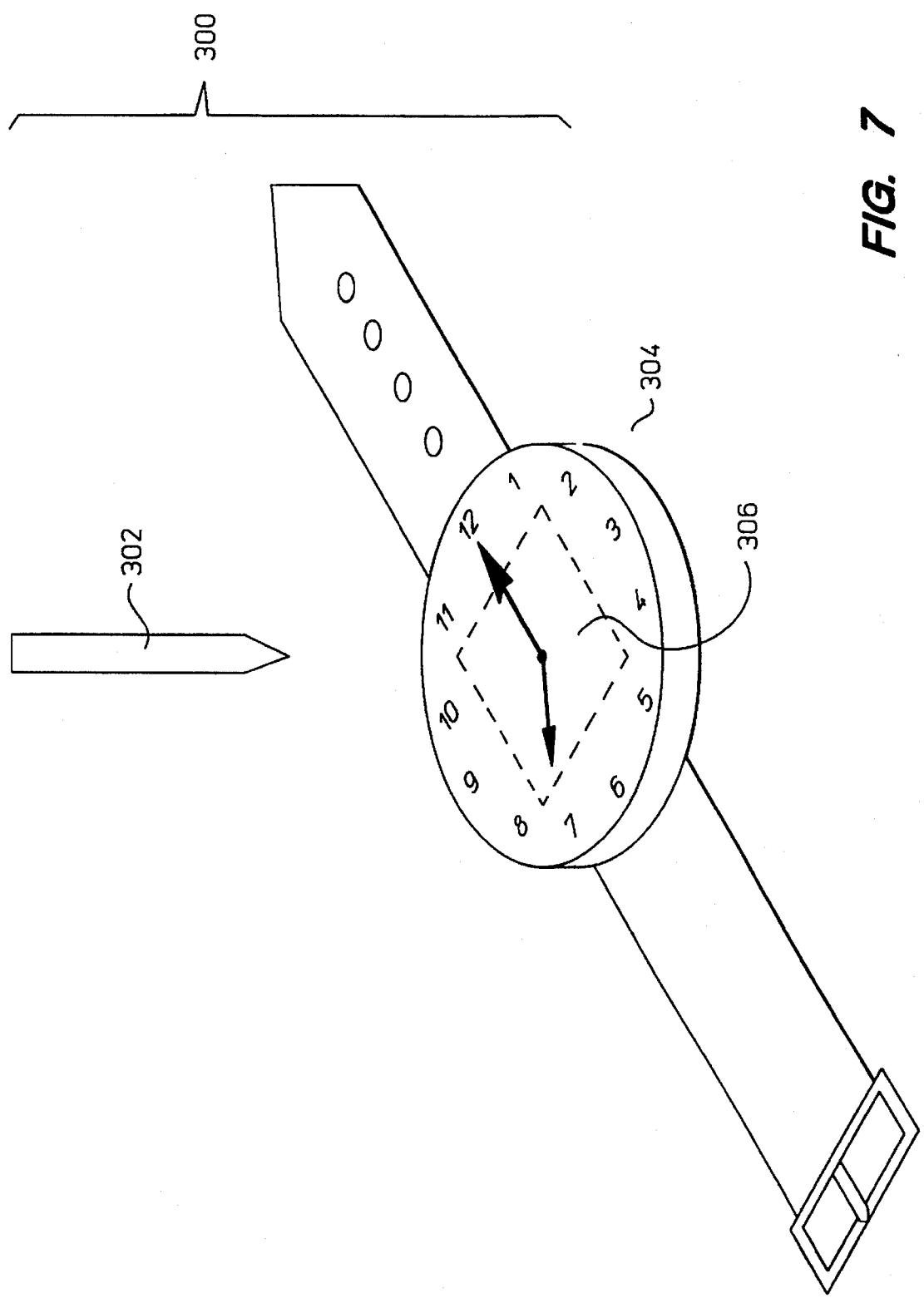
FIG. 7 shows a third preferred embodiment of the invention.

FIG. 7 shows a third preferred embodiment 300 of the present invention. This embodiment 300 includes a pen 302 and a watch 304. The watch 304 has a board 306, similar to the board in the first embodiment, embedded in it. When information is written onto the board by the pen, the information is stored in a memory device inside the board as in the first embodiment. The information written is not displayed on the watch, and can be removed from the watch and transferred to an electronic device using a communication link. One can use this embodiment, for example, to write down a phone number while one is on the run.

The implementation of the accessories with the present invention, such as the bar-code reader 118, the pressure sensor 116, the infra-red link, the microwave link, the radio link, the waterproofed covers or the active pen constantly radiating an electromagnetic field to be captured by a board, should be obvious to those with ordinary skill in the art and will not be further described in this specification.

From the foregoing it will be appreciated that a low-cost and a rugged electronic board has been invented to store and to transfer written information. Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. An apparatus both permitting a user to write on multiple pages or forms and also digitizing the information entered by the user onto the pages or forms, such that the user may retain both copies of completed documents and electronic file data representing information entered onto the pages or forms, the apparatus not itself including a visual display device for displaying the information entered onto the pages or forms, comprising:

a board for mounting the pages or forms thereon;

a stylus for imprinting symbols on the pages or forms without concurrently displaying the symbols electronically;

a sensing mechanism coupled to the board for sensing the symbols and for converting the symbols into information for storage in memory inside the board while the symbols are imprinted, such sensing and conversion of information on the symbols being completed independently of any image information of the pages or forms;

a memory device inside the board for storing the information about the sensed symbols as electronic file data, such storing being completed without reference to any image information of the pages or forms;

a mechanism for identifying at least one of the pages or forms as being current, the memory effective to store information on sensed symbols in association with the current page or form; and an output device of said apparatus coupled to the memory device for providing a data file of the sensed and stored information on the symbols without a concomitant file of image information of the pages or forms with which to duplicate the pages or forms.

2. An apparatus according to claim 1, wherein the apparatus is a portable electronic board to store information and selectively transmit that information to a remote digital device.

3. An apparatus according to claim 1, wherein the mechanism includes a manually-actuated switch that switches between the multiple pages or forms, and a visual display that indicates one of the multiple pages or forms which is current.

4. An apparatus according to claim 1, wherein:

said apparatus receives the multiple pages or forms in stacked, overlapping relationship;

the user selects one of the multiple pages or forms, uses the mechanism to define the selected one of the multiple pages or forms as being current, and writes on the selected one of the multiple pages or forms; and said apparatus identifies data entered with the selected one of the multiple pages or forms, such that electronic file data is automatically associated with the selected one of the multiple pages or forms, notwithstanding presence of other pages or forms within the stacked, overlapping relationship which are beneath the selected one.

5. An apparatus according to claim 1, further comprising:

a power regulating circuit; and a sensing device associated with one of the stylus and the sensing mechanism, the sensing device sensing a predetermined condition and being coupled to the power regulating circuit to provide an indication to the power regulating circuit in response to the predetermined condition;

wherein the power regulating circuit activates the clipboard in response to the indication from the sensing device.

6. An apparatus according to claim 5, wherein said apparatus is adapted to sense one of stylus proximity to the board and pressure of the stylus upon the board, the predetermined condition being the detection of one of them.

7. An apparatus according to claim 1, wherein the output device includes a communications link for communicating to another digital electronic device.

8. An apparatus according to claim 7, wherein the communications link includes a jack that provides selective hardwire communications between said apparatus and another digital electronic device.

9. An apparatus according to claim 7, wherein the communications link includes an infrared communications port that provides infrared communications between said apparatus and another digital electronic device.

10. An apparatus according to claim 7, wherein the communications link includes an radio frequency communications port that provides radio frequency communications between said apparatus and another digital electronic device.

11. An apparatus according to claim 1, wherein the mechanism includes a manually-activated switch and a form number, which is electronically stored in association with imprinted symbols.

12. A method of processing information entered on multiple pages or form, using an electronic board to store and transfer information that both permits the user to write on the pages or forms and also digitizes the information entered by the user onto the page or forms, such that the user may retain both completed documents and electronic file data representing information entered onto the pages or forms, wherein the electronic board includes a mechanism that performs switching between individual ones of the multiple pages or forms, the electronic board not directly providing a visual display of the information entered onto the pages or forms, comprising:
   imprinting symbols on the pages or forms mounted on a board with a stylus;
   sensing the symbols imprinted on the pages or forms without concurrently electronically displaying the symbols on said electronic board;
   converting the sensed symbols into information for storage in memory inside the board while the symbols are imprinted, such sensing and converting being completed without reference to any image information of the pages or forms;
   selectively using the mechanism to
      select a first one of the pages or forms, and distinguish it from others of the multiple pages or forms,
      cause the board to automatically associate electronic file data with the first one of the multiple pages or forms.
      subsequently, select a second, different one of the pages or forms and distinguish it from others of the multiple pages or forms, and
      subsequent to selection of the second, different one of the pages or forms, cause the board to automatically associate electronic file data with the second one of the multiple pages or forms;
   storing the information about the symbols in memory in the board as electronic file data in association with the pages or forms, such storing being completed without reference to any image information of the pages or forms; and
   outputting the electronic file data of the information on the sensed symbols stored in memory inside the board without a concomitant file of image information with which to duplicate the pages or forms, the data being associated, respectively, with the one of first one and second one of the multiple pages or forms.

13. A method according to claim 12, further comprising:
   receiving the multiple pages or forms in stacked, overlapping relationship;
   selecting one of the multiple pages or forms, uses the mechanism to define the selected one of the multiple pages or forms as being current, and writing on the selected one of the multiple pages or forms; and
   automatically associating electronic file data with the selected one of the multiple pages or forms, notwithstanding presence of other pages or forms within the stacked, overlapping relationship which are beneath the selected one.

14. A clipboard adapted to receive multiple pages or forms, each page form being associated with a unique identifier, comprising:
   a stylus for the user to enter information on each page or form;
   a supporting surface that includes a digitizing pad, which receives and supports the pages or forms, the digitizing pad sensing relative movements between the stylus and supporting surface, and responsively storing data representative of movements of the stylus with respect to the pad, without regard to location of any pre-printed matter on the pages or forms;
   a mechanism that is selectively actuated by the user to indicate selection of a new page or form on the paper supporting surface, the mechanism operative to associate the data representative of movements of the stylus with respect to the pad with electronic file data which corresponds to the selected page or form and to cause selection of the selected page or form as a current page or form;
   a memory that receives data from the digitizing pad, and stores the data in an electronic file corresponding to the current page or form; and
   an identification mechanism that electronically associates the unique identifier for each page or form with a corresponding electronic file;
   wherein said electronic clipboard
      receives a plurality of page or forms in a stacked, overlapping relationship, and
      generates electronic file data for each page or form representing relative movements between the stylus and the digitizing pad for a corresponding one of the pages or forms and without any regard to the location of pre-printed matter on the pages or forms.

15. A clipboard according to claim 14, wherein:
   the mechanism includes both a mechanism for detecting a previously unknown form, including a manually-actuated switch and a sensing mechanism that provides an indication when the stylus is in close-proximity to the supporting surface, the mechanism being actuated when the indication is provided subsequent to use of the manually-actuated switch.

16. A clipboard according to claim 14, wherein the clipboard further comprises:
   a visual indication of a unique identifier for the current page or form; and
   means for selecting any one of the multiple pages or forms and causing it to be defined as the current page or form.

17. A clipboard according to claim 14, wherein at least two of the multiple pages or forms are different copies of one identical document, each of at least two to be filled out by the user with different information.

18. A clipboard according to claim 14, wherein at least two of the multiple pages or forms are different, non-identical documents.

19. An electronic board to store and transfer information that receives multiple pages or forms, said electronic board adapted to sense stylus information and to make an electronic record of the same for duplication of information entered on the pages or forms, comprising:

a stylus for the user to enter information on the pages or forms without concurrently displaying the information electronically on said electronic board;

a supporting surface for the pages or forms, the supporting surface including a digitizing pad that senses relative movements between the stylus and the supporting surface, and that responsively produces electronic data representing the same without any distinction between data entry fields; and a memory associated with said electronic board that stores the electronic data as a electronic file representing the information entered on the pages or forms, without distinction between data entry fields and without regard to location of pre-printed matter on the pages or forms;

wherein said electronic board is adapted to receive multiple pages or forms, further comprises means for indicating at least one of the multiple pages or forms which a user desires to write upon as being current, automatically associates the electronic data with the current at least one page or form, and associates the electronic data with others of the multiple pages or forms in response to activation of said means to indicate others of the multiple pages or forms as being current.

* * * * *